Patented Apr. 20, 1937

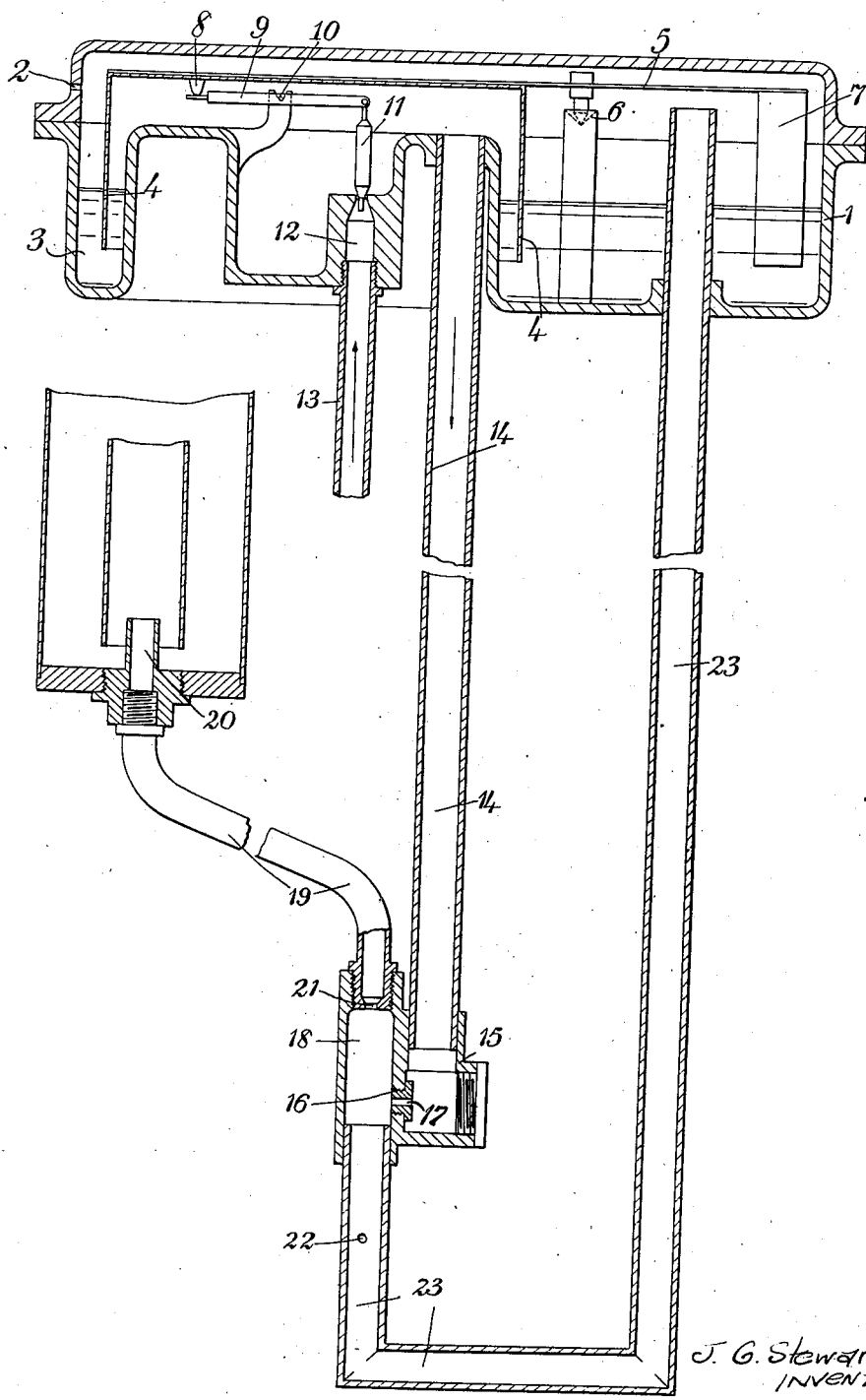

2,077,968

UNITED STATES PATENT OFFICE 2,077,968

GAS FLOW REGULATOR

James Gibb Stewart, Letchworth, England

Application January 2, 1935, Serial No. 170
In Great Britain November 14, 1933

2 Claims. (Cl. 158—119)

This invention relates to gas flow regulators for recording gas calorimeters of the kind designed to secure a constant volumetric flow of gas through an orifice at standard temperature and pressure independent of changes in the specific gravity of the gas and in which the gas after passing a pressure governor forms a gas column extending to an orifice through which the gas passes to, for instance, a burner, the orifice being usually but not necessarily at the base of the gas column.

With known devices of the kind in question the effect of variations in the suction of the burner or the like with which the regulator is associated and changes in the difference of level between the governor and burner as also local minor differences in air pressure due to air currents are liable to introduce errors of considerable magnitude.

In gas flow regulators of the above type the pressure governor is adjusted to throw a pressure equal to the pressure difference in the standard atmosphere between the level of the pressure governor and the level of the gas outlet. For example, when the difference of level is 3 feet the pressure to be thrown by the governor is approximately 4/100 inch water gauge. Gas is commonly of half the density of air and such gas in passing to the lower level of the gas outlet loses half the pressure thrown by the pressure governor leaving 2/100 available to produce flow through the orifice. The suction caused by a small flame in a chimney is commonly 1/100" water gauge. As this flame suction is variable with change in the calorific value of the gas, it is necessary for accuracy that means be provided to maintain a constant pressure at the gas outlet of the flow regulator.

Besides the errors due to variable flame suction, a gas flow regulator in which the burner is itself part of the flow regulator and forms its outlet necessitates that the level of the pressure governor be accurately positioned to correspond to its pressure adjustment. In practice it is useful to have a gas flow regulator which is a self-contained unit so that accuracy of positioning it relative to the burner is not necessary.

To eliminate these or certain of these errors I have proposed in the British specification No. 197,159 to provide in a gas flow regulator of the kind in question a governor of the diaphragm type to control the pressure at the outlet of the orifice and the object of the present invention is to provide other constructions of gas flow regulator in which such errors are eliminated or minimized and more particularly to overcome the necessity for providing a governor at or adjacent to the outlet orifice.

According to the present invention the pressure difference between the air at the pressure governor and at the gas outlet of the gas column is maintained the same as that in the atmosphere between the same levels by an unrestricted pipe connection between the two maintained full of air. To prevent the gas at the gas outlet passing into this pipe, the flame in the calorimeter draws the gas to the burner by a pipe placed above the gas outlet. The air pipe is connected below and air is admitted to it through a hole and the suction of the flame produces an upward flow of air which prevents the flow of gas downwards.

This invention makes the regulation of the gas flow independent of variation of suction at the burner or variation in the height of the gas flow regulator relatively to that of the burner. Without the flow of air in the air pipe gas would pass into it and its buoyancy would be sufficient to produce large errors in the calorimeter.

A gas flow regulator for a recording gas calorimeter in accordance with the invention comprises a pressure governor of the type in which a bell with which a gas control valve is associated is arranged to extend into a body of liquid, and from the space within the bell there extends a gas inlet controlled by the valve under the action of the bell and an outlet pipe extending downward and communicating through a restricted aperture in the wall of the pipe with a conduit in turn connected with a burner and having an air admission aperture in the conduit below the level of the said restricted aperture.

One construction in accordance with the invention is illustrated by way of example in the accompanying drawing which is a sectional elevation of a gas flow regulator and its associated burner.

Referring to the drawing, in a casing 1 furnished with an aperture 2 adapted to restrict the inflow of air there is provided a liquid seal 3 into which extends the lower extremity of a bell 4 connected with a beam 5 supported on knife-edge bearings 6 and provided with a counter-weight 7 adjusted so that the bell throws a pressure equal to the difference of pressure of the atmosphere at the level of the governor and the pressure of the atmosphere at the outlet for the gas from the gas column at standard barometric pressure and temperature and within the bell there is provided an abutment 8 adapted to actuate a lever 9 suitably pivoted at 10 and provided with a valve 11 co-operating with the outlet 12 of a pipe 13 adapted to be connected with the gas supply.

From the space within the bell there extends in a downward direction a pipe 14 enclosing a gas column, the lower end of this pipe being furnished with a connection 15 in which is located a nipple 16 furnished with an orifice 17 the size of which determines the flow of gas, the nipple being removable for cleaning. A tubulure 18 extends from the orifice and makes connection with a pipe 19 connected with or adapted to be connected with a burner 20.

In this latter pipe there may be also provided a restriction 21 unless the suction of the burner is small or the pipe itself offers sufficient resistance, the restriction or resistance being adjusted to ensure a flow of air through an air hole 22 provided in the walls of a pipe 23 sufficient to prevent the gas passing downwards below the orifice and sufficient further to prevent any variation in the draught produced by the combustion of gas at the burner causing any appreciable drop of pressure at the vicinity of the orifice 17 such as would cause a variation in the rate of delivery of gas through such orifice. This pipe 23 encloses an air column and extends downward from the level of the orifice 17 for a convenient distance and then in the construction illustrated an upward direction to a point within the casing for the governor.

The aperture 2 furnished in the casing for the governor provides for ventilation of the air column and is preferably smaller than that through which air is admitted to the lower end of the air column as the resistance to air flow due to the walls of and the bends in the pipe enclosing the air column is sufficient to cause an error unless the pipe is of large cross-section.

As will be understood, the above particulars of one construction are given for the purpose of assisting in the understanding of the invention and various changes may be made in the details of construction and arrangement without exceeding the scope of the appended claims.

With the construction above described in detail the bell 4 is weighted, as above indicated, to throw a pressure equal to the difference of pressure of the atmosphere at the level of the governor and the pressure of the atmosphere at the level of the orifice 17.

The gas issuing by way of this orifice being of lower density than air, will rise in the pipe 19 to the burner 20 and the upward flow of the gas due not only to this difference in density but also to the suction or draught resulting from the combustion of the gas at the burner, will tend to produce suction in the vicinity of the orifice 17, and thereby accelerate the rate of flow of gas through the orifice and destroy the whole purpose which the device is designed to serve, namely, to secure a constant rate of flow of gas through the orifice 17. In order to prevent such suction or variations in the degree of suction due to variation, in the density of gas or variations in the calorific value thereof which would cause variation in the draught set up by the burner, provision is made to admit air to the conduit leading to the gas burner, such admission of air being secured by providing the air hole 22 at a point below the level of the orifice 17, for should conditions arise such as would otherwise operate to effect a reduction in pressure and thus to give rise to suction at or in the vicinity of the nozzle 17, air which, as is evident will be at slightly higher pressure than the air at the level of the orifice 17, will enter the air hole 22 and thereby neutralize the effect in question.

The function of the connection of the conduit 23 with the chamber 1 in which the gas governor is enclosed is to prevent gas by diffusion passing away from the burner and thus escaping to the atmosphere and, further, to ensure that gas does not accumulate within the chamber, there is provided the aperture 2 whereby air may enter the chamber.

Having now described my invention, what I claim as new and desire to secure by Letters Patent is:—

1. A gas flow regulator for a recording gas calorimeter comprising a pressure governor including a casing adapted to contain a body of liquid to form a liquid seal and furnished with an aperture adapted to restrict the inflow of air to the casing, a beam within the casing, knife edge bearings for said beam, a bell secured to the beam and adapted to extend into the body of liquid contained in the casing to form a liquid seal for the bell, a counterweight for the bell secured to the beam, a lever located within the bell, bearings on said casing supporting the lever, an abutment on the bell contacting with one end of the lever, a gas inlet in the casing and within the bell adapted to supply gas to the space enclosed by the bell, a valve seating associated with the gas inlet, a movable valve element secured to the lever cooperating with said seating, a gas outlet from the space within the bell, a pipe extending from the outlet in a downward direction, a member furnished with a restricted aperture for the outflow of gas connected with the pipe, a tubulure extending from said member, a pipe connected with the tubulure at a point above the level of the restricted aperture and adapted to be connected with a burner, and a pipe extending from the tubulure at a point below the level of the restricted aperture to the casing, said pipe having a restricted aperture adapted to admit air to the tubulure at a level below that of the aperture by which gas is admitted thereto.

2. A gas flow regulator for a recording gas calorimeter comprising a chamber adapted to contain a body of liquid, said chamber communicating with the atmosphere and having an aperture in the base thereof and a valve seat in said aperture, a source of gas supply adapted to communicate with said chamber through said aperture, an outlet pipe extending downward from said chamber, a burner, a conduit connected to the burner and communicating with said outlet pipe through a restricted aperture in the wall of said pipe at a point remote from said chamber, a bell in said chamber covering said first named aperture and said outlet pipe, a movable valve element associated with the bell and cooperating with said valve seat in regulating the flow of gas into the space enclosed by the bell, means for loading said bell to ensure that the pressure of the gas within said space corresponds with the pressure of the atmosphere at the level of the restricted aperture, said conduit having an air admission aperture below the level of the restricted aperture and a connection between said conduit at a level below the air admission aperture and the chamber.

JAMES GIBB STEWART.